United States Patent [19]
Sun et al.

[11] Patent Number: 5,838,380
[45] Date of Patent: Nov. 17, 1998

[54] MEMORY CONTROLLER FOR DECODING A COMPRESSED/ENCODED VIDEO DATA FRAME

[75] Inventors: Yuanyuan Sun, San Jose, Calif.; Chih-Ta Sung, Princeton, N.J.; Jih-Hsien Soong, Cupertino, Calif.; Richard Chang, San Jose, Calif.; Tzoyao Chan, Saratoga, Calif.; Chia-Lun Hang, San Jose, Calif.

[73] Assignee: Cirrus Logic, Inc., Fremont, Calif.

[21] Appl. No.: 372,794

[22] Filed: Dec. 23, 1994

Related U.S. Application Data

[63] Continuation-in-part of Ser. No. 316,015, Sep. 30, 1994, Pat. No. 5,594,660.

[51] Int. Cl.$^6$ ................................................. H04N 7/137
[52] U.S. Cl. ........................... 348/412; 348/415; 348/409
[58] Field of Search ................................ 370/94.2, 110.1, 370/112, 118, 94.1; 371/2.1; 348/390, 409, 411, 412, 413, 414, 415, 416, 417, 418, 423, 473, 474; 395/185.01, 185.02, 185.04; 364/239, 239.8, 246.5, 962, 942.03, 942.04, 964, 964.1

[56] References Cited

U.S. PATENT DOCUMENTS

| | | | |
|---|---|---|---|
| 5,148,272 | 9/1992 | Acampora et al. | 348/397 |
| 5,212,742 | 5/1993 | Normile et al. | 382/56 |
| 5,274,453 | 12/1993 | Maeda | 348/409 |
| 5,347,322 | 9/1994 | Levine et al. | 348/718 |
| 5,351,046 | 9/1994 | Adcox | 341/62 |
| 5,372,173 | 12/1994 | Nishzawa et al. | 348/412 |
| 5,379,356 | 1/1995 | Purcell et al. | 382/56 |
| 5,386,234 | 1/1995 | Vettiman | 348/412 |
| 5,432,900 | 7/1995 | Rhodes | 395/154 |
| 5,517,612 | 5/1996 | Dwin et al. | 395/166 |
| 5,559,999 | 9/1996 | Marturi et al. | 370/94.2 |

FOREIGN PATENT DOCUMENTS

| | | |
|---|---|---|
| 0 389 835 A2 | 10/1990 | European Pat. Off. . |
| 0 510 640 A2 | 10/1992 | European Pat. Off. . |
| 0 522 853 A3 | 1/1993 | European Pat. Off. . |
| 0 545 323 A1 | 6/1993 | European Pat. Off. . |
| 0 658 053 A1 | 6/1995 | European Pat. Off. . |
| 0 673 171 A2 | 9/1995 | European Pat. Off. . |
| 2083578 | 3/1990 | Japan . |
| 2083579 | 3/1990 | Japan . |

OTHER PUBLICATIONS

Dave Bursky."Improved DSP ICs Eye New Horizons," Nov. 11, 1993, *Electronic Design* vol. 41, No. 23, pp. 80–82.

C–Cure Microsystems. "CL450™ MPEG Video Decoder User's Manual," 1992, Chapters 2 & 9, pp. 2–1 to 2–12 and 9–1 to 9–17.

AT&T Technical Journal, vol. 72, No. 1, Jan. 1993, Short Hills, NJ, United States; Ackland et al.

J. Fandrianto et al., A programmable Solution for Standard Video Compression, COMPCON '92, San Francisco, CA, pp. 47–50, Feb. 24, 1992.

*Primary Examiner*—Wellington Chin
*Assistant Examiner*—Huy D. Vu
*Attorney, Agent, or Firm*—Steven A. Shaw; Robert P. Bell

[57] ABSTRACT

A multimedia system includes an audio/video decompresser/decoder for decompressing/decoding a compressed/encoded audio/video data stream in order to generate video images for display on a display device and to generate audio signals for audible reproduction. The multimedia system includes an integrated system and video decoder that has a novel memory controller and a novel method for displaying complete decoded/decompressed video frames on a display device without tearing. By use of selective storage of decoded/decompressed video frames in memory, tearing is prevented but information for predicting motion of a video segment is preserved.

10 Claims, 10 Drawing Sheets

I-TYPE FRAME
FIG. 2A
(Prior Art)

P-TYPE FRAME
FIG. 2B
(Prior Art)

B-TYPE FRAME
FIG. 2C
(Prior Art)

MEMORY CONTROLLER FOR DECODING A COMPRESSED/ENCODED VIDEO DATA FRAME

RELATED APPLICATIONS

This application is a continuation-in-part of application Ser. No. 08/316,015, filed on Sep. 30, 1994 now U.S. Pat. No. 5,594,660.

FIELD OF THE INVENTION

This invention relates generally to the field of the multimedia applications. More particularly, this invention relates to a decoder/decompressor and memory controllers for multimedia. The invention is particularly suited for the Motion Picture Expert Group's (MPEG I+II) data compression/decompression standards.

BACKGROUND OF THE INVENTION

Figure 1A:
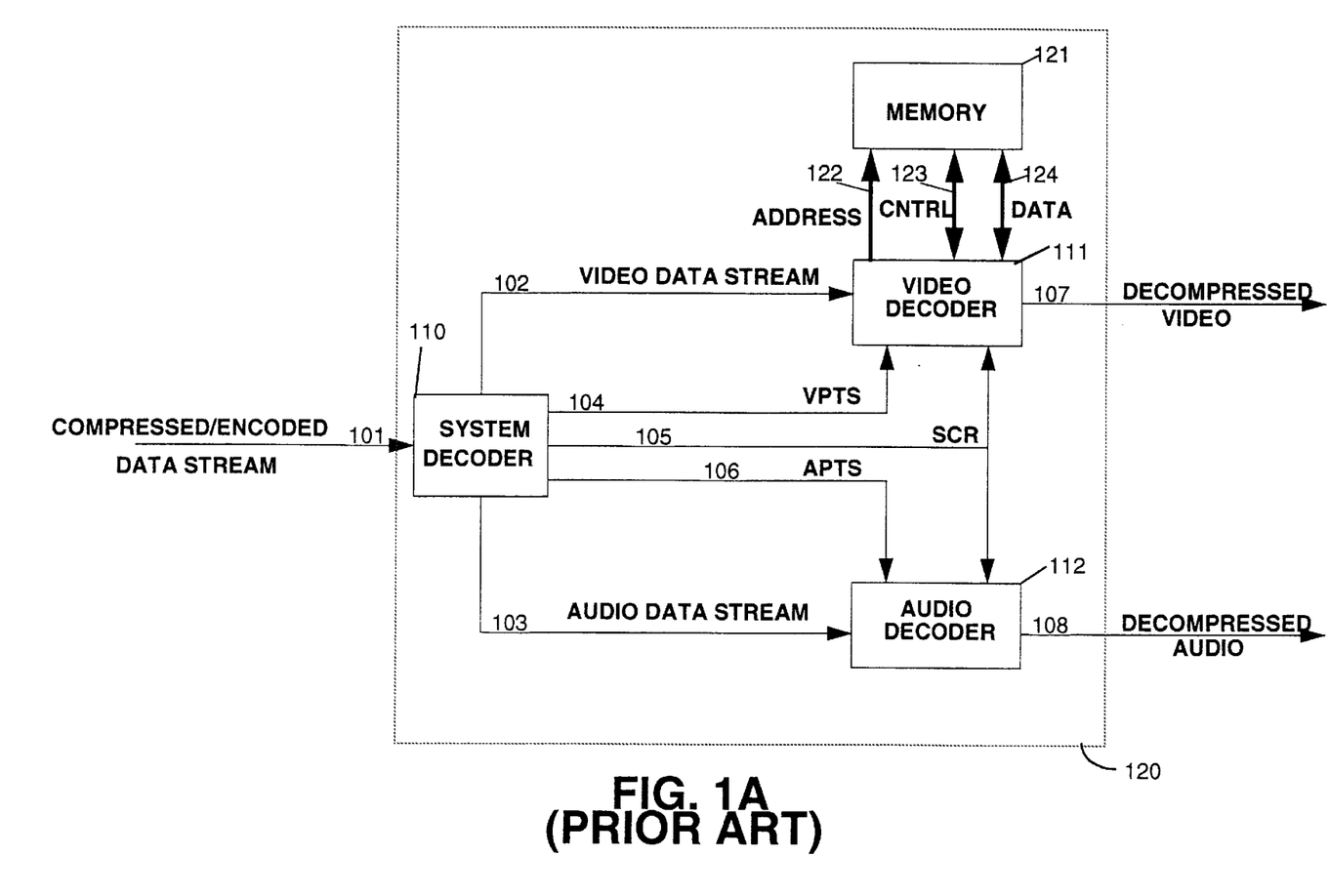
FIG. 1A is a prior art block diagram of an MPEG decoding system.

The personal computer has recently adopted multimedia applications which include audio and video information. Several multimedia groups have established and proposed standards for compressing/encoding and decompressing/decoding the audio and video information. MPEG I and II, established by the Motion Picture Expert Group, are the most widely accepted international standards in the field of the multimedia PC applications. Other standards are JPEG and Motion JPEG established by the Joint Photographic Expert Group. FIG. 1A is a diagram of an MPEG audio and video decoder 120 that performs decompression of the video and/or audio data that has been compressed and coded according to the MPEG algorithm. The system decoder 110 reads the encoded MPEG data stream 101 having interlaced compressed video and/or audio data, and generates necessary timing information; Video Presentation Time Stamp (VPTS) 104; System Clock Reference (SCR) 105 which is also referred to as system time clock (STC); Audio Presentation Time Stamp (APTS) 106; and separated video encoded bit streams 102 and audio encoded bit streams 103. The video decoder 111 decompresses the video data stream 102 and generates a decompressed video signal 107. The audio decoder 112 decompresses the audio data stream 103 and generates the decompressed audio signal 108. The decompressed video signal 107 is coupled to a PC monitor or other type of display unit, while the decompressed audio signal 108 is coupled to an audio speaker or other audio generation means.

Figures 2A, 2B:
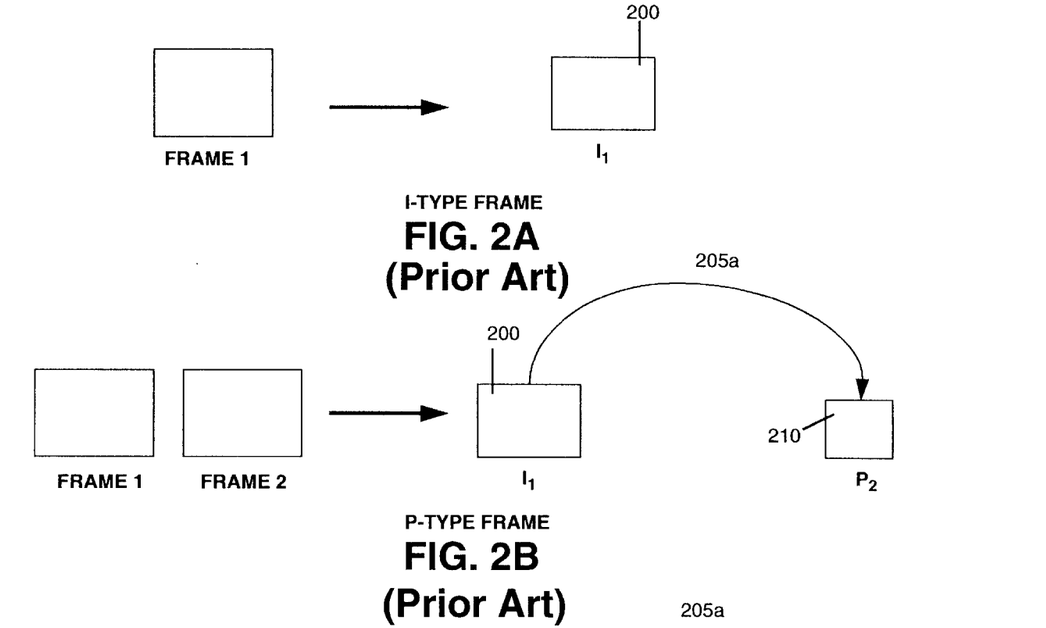
FIG. 2A–2D are diagrams showing the prior art encoding/compression of video frames.
Figure 2C:
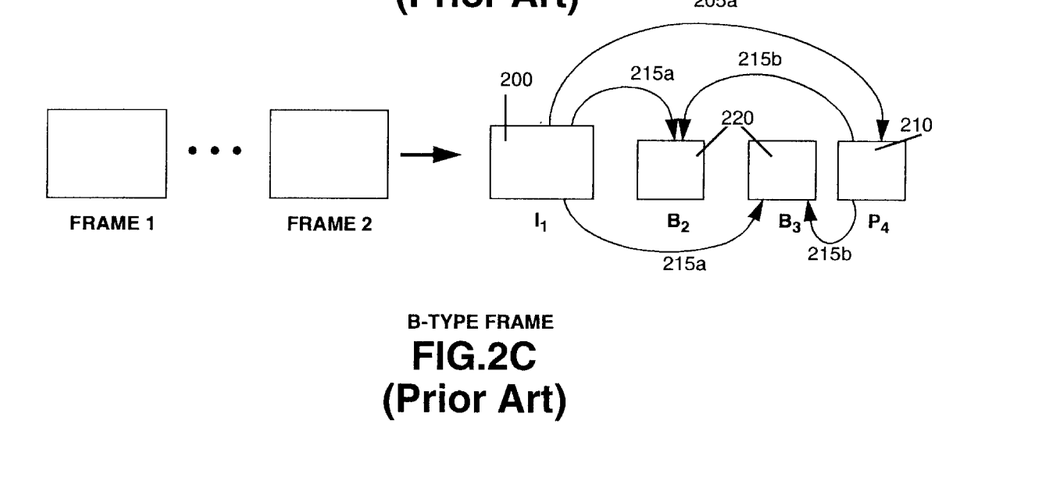
Figure 2D:
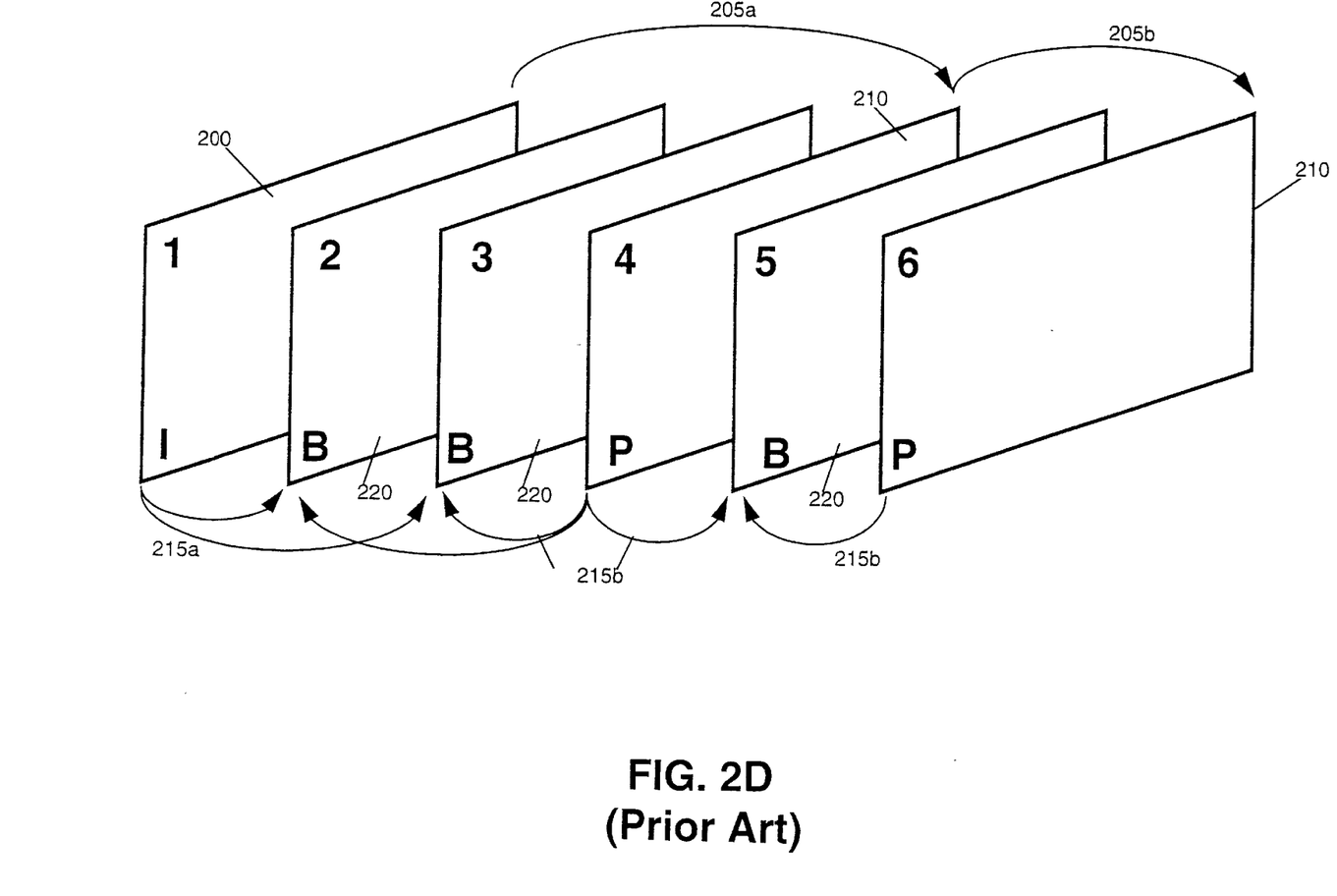

The MPEG encoded/compressed data stream may contain a plurality of encoded/compressed video data packets or blocks and a plurality of encoded/compressed audio data packets or blocks. An MPEG encoder encodes/compresses the video packets based on video frames, also referred to as pictures. These pictures or frames are source or reconstructed image data consisting of three rectangular matrices of multiple-bit numbers representing the luminance and two chrominance signals. FIGS. 2A–2C illustrate the type of encoded/compressed video frames that are utilized. FIG. 2A depicts an Intra-frame or I-type frame 200. The I-type frame or picture is a frame of video data that is coded without using information from the past or the future and is utilized as the basis for decoding/decompression of other type frames. FIG. 2B is a representation of a Predictive-frame or P-type frame 210. The P-type frame or picture is a frame that is encoded/compressed using motion compensated prediction from an I-type or P-type frame of its past, in this case, $I_1$ 200. That is, a previous frame is used to encode/compress a present given frame of video data. 205a represents the motion compensated prediction information to create a P-type frame 210. FIG. 2C depicts a Bi-directional-frame or B-type of frame 220. The B-type frame or picture is a frame that is encoded/compressed using a motion compensated prediction derived from the I-type reference frame (200 in this example) or P-type reference frame in its past and the I-type reference frame or P-type reference frame (210 in this example) in its future or a combination of both. B-type frames are usually inserted between I-type frames or P-type frames. FIG. 2D represents a group of pictures in what is called display order $I_1B_2B_3P_4B_5P_6$. FIG. 2D illustrates the B-type frames inserted between I-type and P-type frames and the direction which motion compensation information flows.

Motion compensation refers to using motion vectors from one frame to the next to improve the efficiency of predicting pixel values for encoding/compression and decoding/decompression. The method of prediction uses the motion vectors to provide offset values and error data that refer to a past or a future frame of video data having decoded pixel values that may be used with the error data to compress/encode or decompress/decode a given frame of video data.

The capability to decode/decompress P-type frames requires the availability of the previous I-type or P-type reference frame and the B-type frame requires the availability of the subsequent I-type or P-type reference frame. For example, consider the encoded/compressed data stream to have the following frame sequence or display order:

$I_1B_2B_3P_4B_5P_6B_7P_8B_9B_{10}P_{11} \ldots P_{n-3}B_{n-2}P_{n-1}I_n$.

The decoding order for the given display order is:

$I_1P_4B_2B_3P_6B_5P_8B_7P_{11}B_9B_{10} \ldots P_{n-1}B_{n-2}I_n$.

The decoding order differs from the display order because the B-type frames need future I or P-type frames to be decoded. P-type frames require that the previous I-type reference frame be available. For example, $P_4$ requires $I_1$ to be decoded such that the encoded/compressed $I_1$ frame needs to be available. Similarly, the frame $P_6$ requires that $P_4$ be available in order to decode/decompress frame $P_6$. B-type frames, such as frame $B_3$, require a past and future I or P-type reference frames, such as $P_4$ and $I_1$ in order to be decoded. B-type frames are inserted frames between I-type, P-type, or a combination during encoding and are not necessary for faithful reproduction of an image. The frames before an I-type frame, such as $P_{n-1}$ in the example, are not needed to decode an I-type frame, and no future frames require $P_{n-1}$ in order to be decoded/decompressed.

Generally, every second of motion requires at least two I-type frames. I-type frames have a sampling rate of 150 kilobits per second, whereas P-type frames have a sampling rate of 50 kilobits per second.

The display process may be slower than the decoding process. For example, a 240×16 picture requires 3072 clock cycles to decode(76.8 us at 40 Mhz); it takes 200 us to display 16 lines of video data at a 75 Hz refresh rate(13 us×16=200 us). The video frames are buffered before being displayed. There is usually a one frame delay between display and decoding. The difference between display and decoding leads to a condition known as tearing. Tearing occurs when the display frame is overwritten by the decoded frame.

Figure 1B:
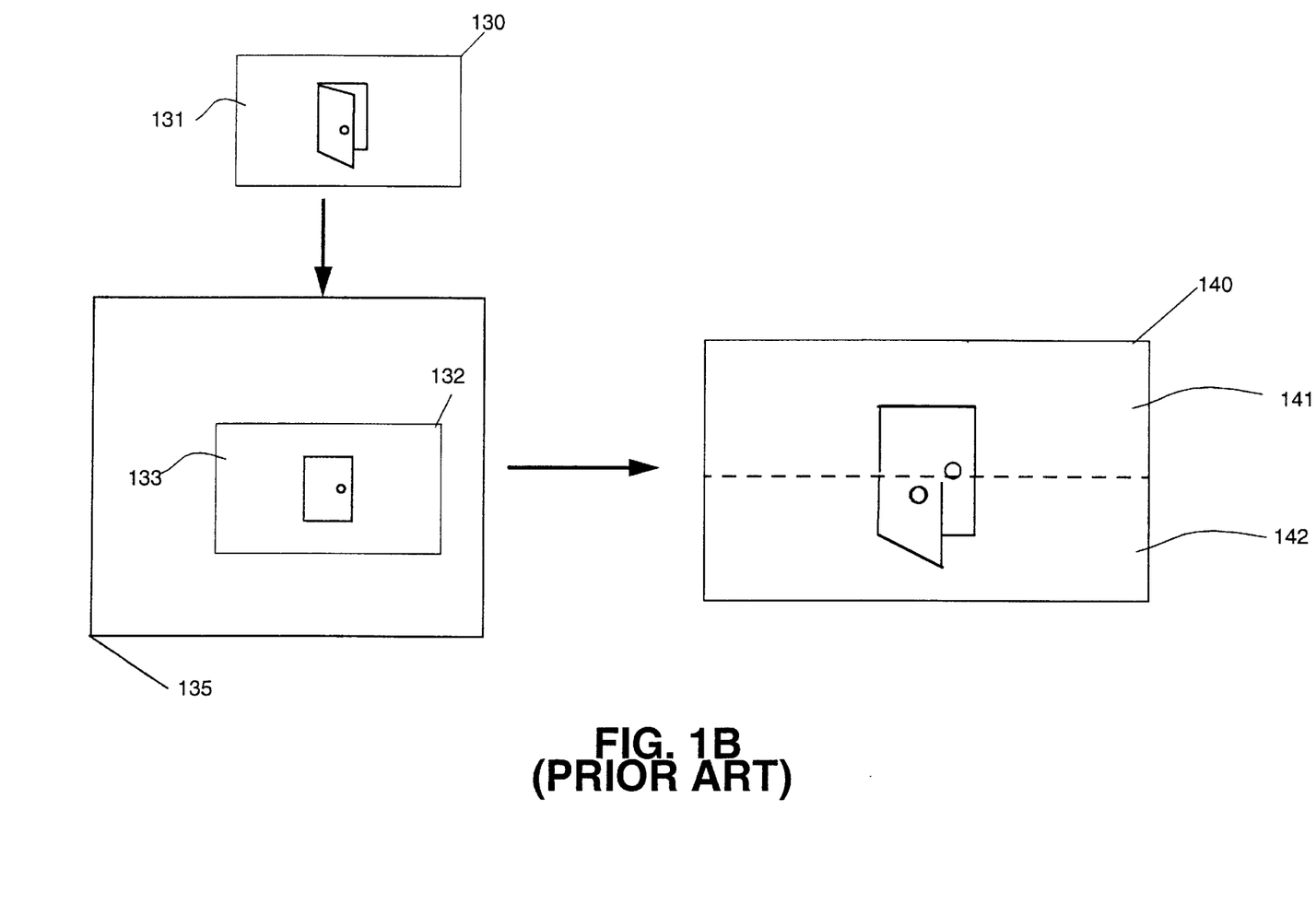
FIG. 1B is a drawing showing the problem of tearing within prior art devices where frame data from two different frames stored consecutively in frame buffer memory is displayed on a display device.

FIG. 1B depicts tearing. A decoded/decompressed frame 132 of data representing the image of a closed door 133 is currently stored in a buffer 135. This decode/decompressed frame is currently being displayed on display unit 140. During this display period another decoded/decompressed frame 130 with data representing the image of an open door 131 is stored in buffer 135. The display unit 140 will now start displaying using information from the new frame now stored in 135. The result is a partial display of the first stored image 141 and partial display of the new stored image 142. This is the tearing effect.

Figure 7A:
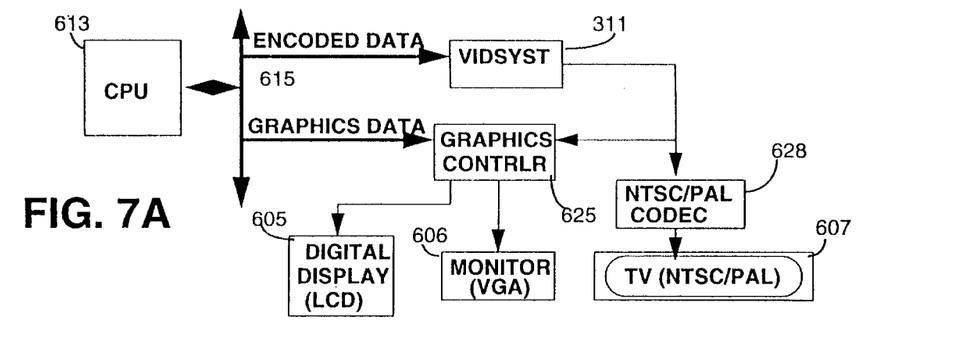
FIG. 7A–7C depict optional configurations of the present invention for combining graphics and encoded data transfer.
Figure 7B:
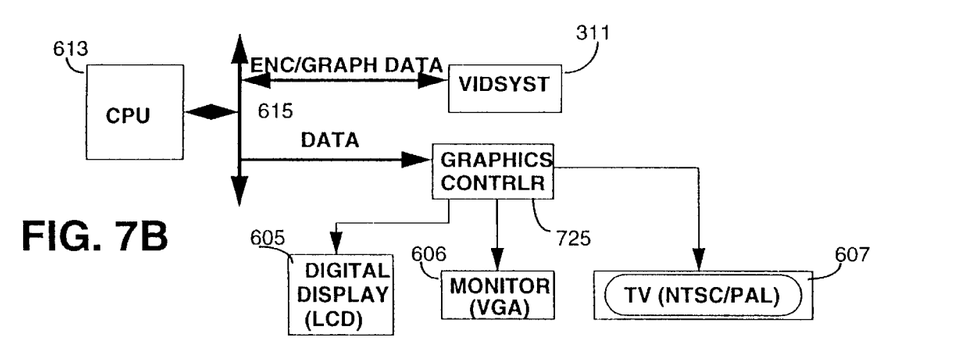
Figure 7C:
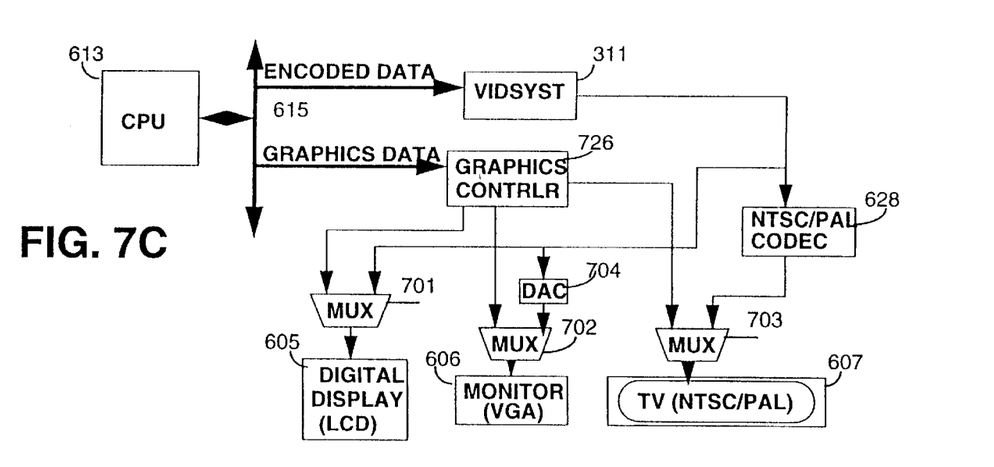

The various methods of combining the MPEG stream with the normal video stream can be seen from FIG. 7A–C.

SUMMARY OF THE INVENTION

A multimedia system is described including an integrated system and video decoder having a novel memory controller circuit which uses less storage space to process video frames for display. The multimedia system has an audio/video decoding/decompressing circuit for decoding an encoded/compressed data stream to separate the encoded/compressed data stream into encoded/compressed audio data and encoded/compressed video data. A memory with addressable storage is address partitioned into a first region for temporary storage of the compressed audio data and the encoded/compressed video data and a second region comprising a plurality of slots for selectively storing decoded/decompressed video frames. A decoder is provided to decode the encoded/compressed video data and generating decoded/decompressed video data.

Novel methods are described for efficiently using frame buffer memory thereby decreasing the costs of multimedia systems. The methods involve receiving an encoded/compressed video frame, determining whether it is a B-type, P-type or I-type frame. The type of decoded/decompressed video frame currently displayed is also determined. The encoded/compressed video frame is then decoded and written into the various slots of the address partitioned memory according to the following table.

The following table summarizes the actions of the disclosed invention:

SUMMARY OF ACTIONS

| DISPLAY FRAME TYPE | DECODE FRAME TYPE | ACTIONS OF THE PRESENT INVENTION |
|---|---|---|
| B | B | Drop decoding B frame (FIG. 5A). |
|  | I/P | Replace oldest I or P frame (FIG. 5B). |
| I/P | B | If there is a B frame in slot3 373 and it has been displayed, then overwrite it (FIG. 5C). |
|  |  | If there in no B frame nor an empty slot3 373, then drop the decoded B frame (FIG. 5D). |
|  |  | If there is an empty slot3, then write into the empty slot3 373 (FIG. 5E). |
|  | I/P | If there is a B frame in slot3, then overwrite it (FIG. 5F). |
|  |  | If there is I/P frame in slot3, then overwrite oldest I or P frame except the one being displayed (FIG. 5G). |

A portion of a multimedia system compresses/encodes audio sounds and video images into a compressed/encoded bit stream that contains time information, compressed/encoded packets of video data, and compressed/encoded packets of audio data. The compressed/encoded bit stream may be recorded onto a CDROM or other storage device for later reproduction or it may be directly transferred to the reproduction portion of the multimedia system for present display of video images and audio playback.

The reproduction portion of the multimedia system generally includes a compact disk read-only-memory reader, a processor circuit, an audio/video decoder circuit, audio speakers for sound generation, and one or more display devices to display images that may correspond to the sound reproduction.

The invention accordingly reduces to decrease the cost of system design by minimizing the number and size of memory circuits needed to control display within a multimedia system receiving compressed/encoded audio and video data frames.

DETAILED DESCRIPTION OF THE INVENTION

Figure 3:
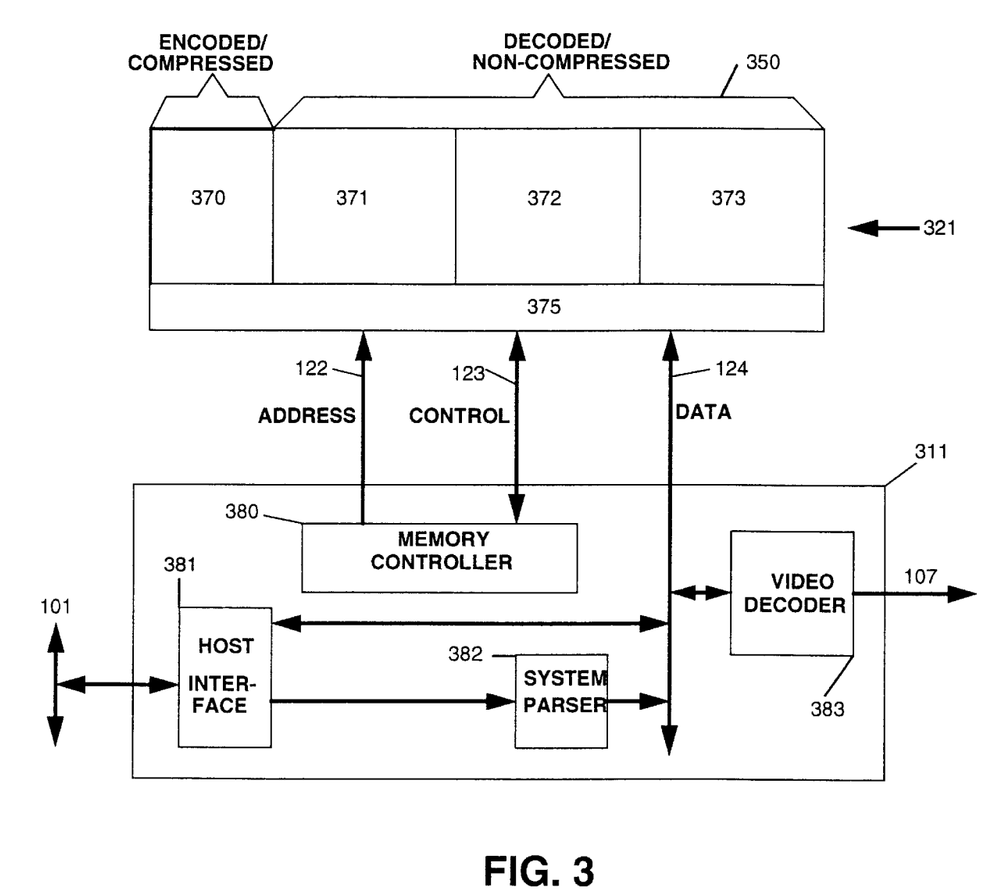
FIG. 3 is a block diagram of the present invention interfacing with a three-slot frame buffer memory array.

Referring to FIG. 3 showing a first embodiment of the present invention, memory 321 is partitioned by address locations into multiple regions. The first region, referred to as a bitstream buffer 370, is for temporary storage of audio and video encoded data packets. The second region within memory 321 (referred to as the frame buffer 350) is address partitioned into three subregions called slots 371–373. Slot1 371, slot2 372, and slot3 373 are each capable of storing one complete frame of a decoded/decompressed video frame.

A monolithic integrated circuit, referred to herein as a "Vidsyst" (Video-System) Decoder, implements the algorithm and circuitry of the present invention. The Vidsyst decoder 311 has a host interface 381 that receives the MPEG data stream 101 from a processor (not shown) and passes the encoded data packets to a system parser 382. The system parser 382 parses the video encoded data packets from the audio encoded data packets as well as the timing information (VPTS 104, SCR 105, APTS 106) from the data packets. The video encoded data packets are sent as a video data stream to be temporarily stored in the bitstream buffer 370 in memory 321. The audio encoded data packets are also temporarily stored in the bitstream buffer in memory 321. When ready, the video encoded data packets within the bitstream buffer 370 in memory 321 are read out to be decoded and decompressed within the video decoder 383 to generate decompressed video data 107.

For decoding the various types of encoded frames, it is necessary to use reference frames to decode P-type encoded frames and B-type encoded frames. Thus, the decompressed/decoded frame of data is normally saved back into memory 321 to be utilized to decode other frames. If the decompressed video data frame is not ready to be displayed because of system delay this frame may be skipped. When ready, the audio encoded data packets within the bitstream buffer 370 in memory 321 are also read out to be decoded and decompressed to an audio decoder (not shown) to generate decompressed audio data.

Within the video encoded data packets are the various encoded video frames. Of these, an I-type frame requires approximately 20K bytes of memory, a P-type frame requires approximately 10k bytes, and a B-type frame requires approximately 3K bytes. In the first embodiment, the second region within memory 321 (referred to as the frame buffer 350) has three slots 371–373 partitioned by addresses. Slot1 371, slot2 372, and slot3 373 are each capable of storing one complete frame of a decoded/decompressed video frame. Typically, slot1 and slot2 are used to store decoded/decompressed I-type and P-type video frames whereas slot3 usually stores decoded/decompressed B-type frames but may also store decoded/decompressed I-type and P-type video frames, as will be discussed below.

Memory array 321 includes an address decoder, data buffer, and control circuit 375 in order to properly address the memory regions. Typically the memory is of a dynamic random access memory (DRAM) type, but could alternately be video memory (VMEM) type or a static random access memory (SRAM) type.

Within the Vidsyst decoder 311, the memory controller 380 in conjunction with other circuitry generates address 122 and control 123 for the memory 321. The generated address and control is properly timed with the according data to be written to or read from the memory 321.

Figure 4:
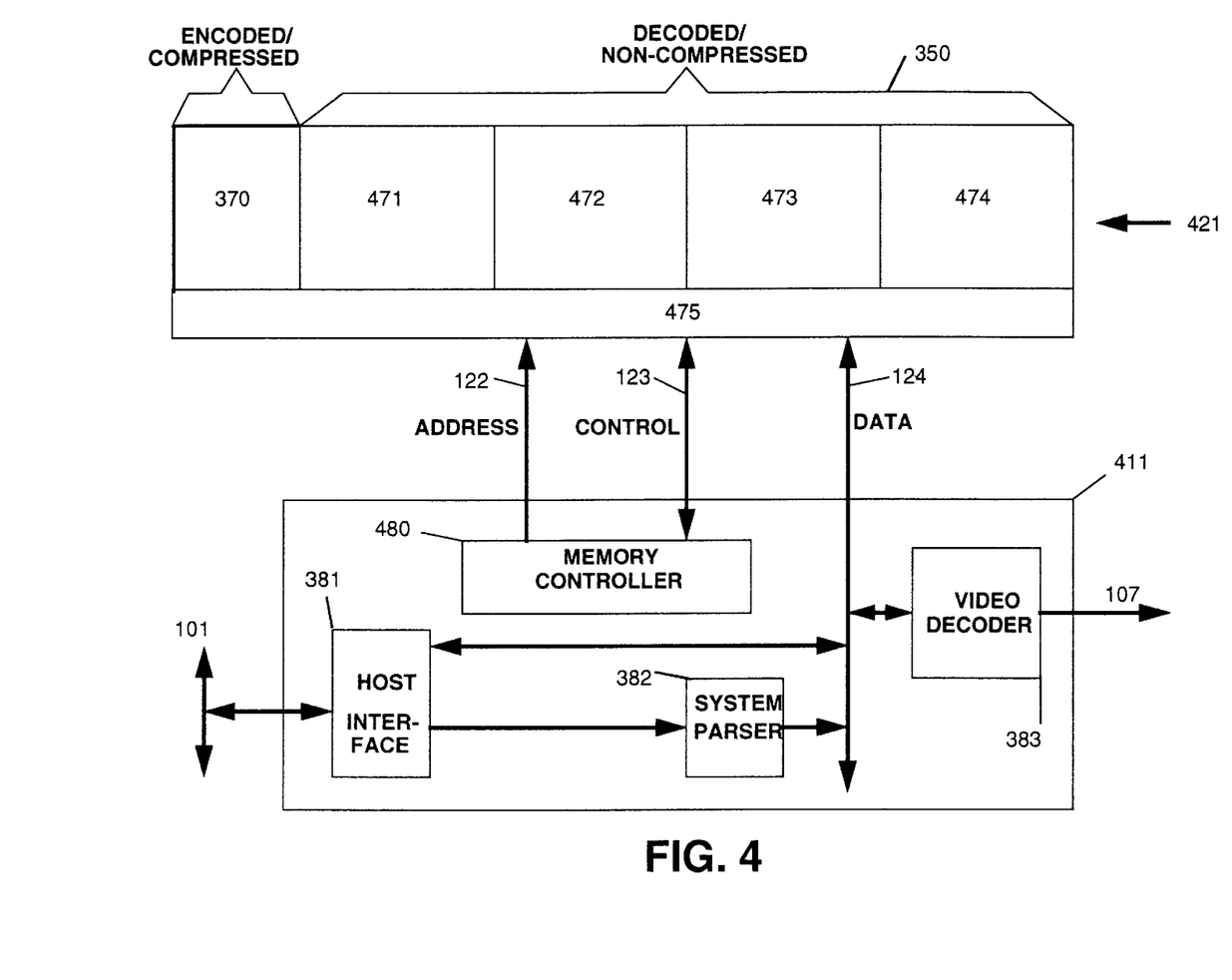
FIG. 4 is a block diagram of the present invention interfacing with a four-slot frame buffer memory array.

FIG. 4 shows a second embodiment of the invention, wherein, a memory 421 partitioned by address locations into different regions including four "slots" for storing frames of video data. A first region 370 is the bitstream buffer as in FIG. 3, is for the temporary storage of the encoded video and audio packets. A second region within memory 421 (referred to as the frame buffer 450) has four slots 471–473 partitioned by addresses. Slot1 471, slot2 472, slot3 473 and slot 474 are each capable of storing one complete frame of a decoded/decompressed video frame with same size.

With a four-slot partition of frame buffer memory there is no tearing problem. A slot of memory will be available without having to write into a slot that has a frame which is currently being displayed. Furthermore with a four-slot memory partition, it is possible to freeze the display. However for lower cost computer systems, a smaller amount of memory is preferable. Hence, a more efficient use of memory using a three-slot solution is more desirable. By dropping certain B-type frames and overwriting frames in selected slots, the problem of tearing as seen in the prior art and illustrated by FIG. 1B will not occur. For example, consider the following cases as illustrated by FIGS. 5A–5G.

Figure 5A:
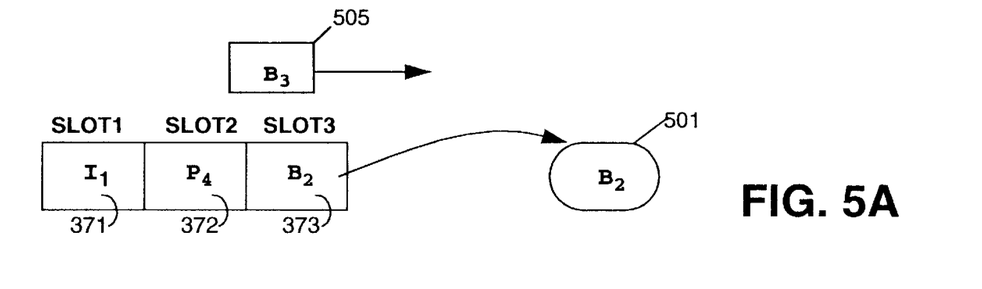
FIG. 5A–5G are diagrams representing a decoding method of the present invention using a three-slot frame buffer memory.

FIG. 5A, a first example, assumes a display order $I_1B_2B_3P_4$ and a corresponding decoding order $I_1P_4B_2B_3$. Thus, the video decoder 383 first decodes the $I_1$ frame and stores the decoded/decompressed $I_1$ frame in slot1 371. Utilizing the previously stored decoded/decompressed $I_1$ frame, the $P_4$ frame is decoded next. The decoded/decompressed $P_4$ frame is stored into slot2 372. The $B_2$ frame is decoded next, utilizing one or both decoded/decompressed frames $I_1$ and $P_4$ respectively stored within slot1 371 and slot2 372. The decoded/decompressed $B_2$ frame is stored within slot3 373.

It is desirable to next decode/decompress the $B_3$ frame 505. However, using a three-slot memory array; one does not want to overwrite any of the slots presently stored with the decode/decompressed $I_1$, $P_4$, and $B_2$ frames before they are displayed. In the case of decoded/decompressed $I_1$ and $P_4$ frames, these are needed to properly decode the $B_3$ frame.

In the case of the decoded/decompressed $B_2$ frame, this frame may have not been displayed on a display device or is only partially displayed on the display device. If the decoded/decompressed $B_2$ is overwritten with the decoded/decompressed $B_3$ frame, the problem of tearing may occur (see FIG. 1B). To avoid this, the decoded/decompressed $B_3$ frame information is not stored into memory array 321 and will not be displayed, thus allowing the decoded/decompressed $B_2$ frame to be fully displayed. Because, B-type frames are not essential to a substantial reproduction of the decompressed MotionVideo™ segments, overwriting of a decoded/decompressed B-type frame that is being displayed or has yet to be displayed is not allowed in the three-slot frame buffer system.

Figure 5B:
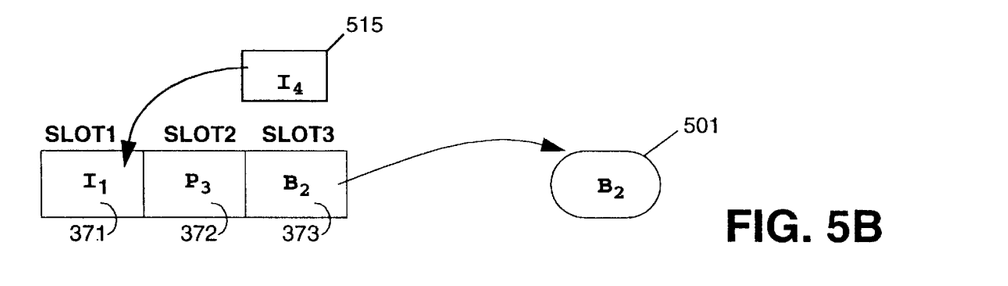

Refer to FIG. 5B for a second example having the display order $I_1B_2P_3I_4$ and the corresponding decoding order $I_1P_3B_2I_4$. The video decoder 383 first decodes the $I_1$ frame and stores the decoded/decompressed $I_1$ frame within slot1 371. The $P_3$ frame is decoded next, utilizing the previously stored decoded/decompressed $I_1$ frame and stored into slot2 372. The $B_2$ frame is decoded next, utilizing the decoded/decompressed frame $I_1$ stored in slot1 371 and the decoded/decompressed frame $P_3$ stored in slot2 372. The decoded/decompressed frame $B_2$ is stored in slot3 373.

$I_4$ 515 is to be decoded next, while decoded/decompressed frame $B_2$ currently being displayed. I-type frames do not require information from any other frames. Therefore, the oldest I-type or P-type frame can be overwritten. Thus, we overwrite the decoded/decompressed frame $I_1$ which is stored in slot1 371 with decoded/decompressed frame $I_4$.

Figure 5C:
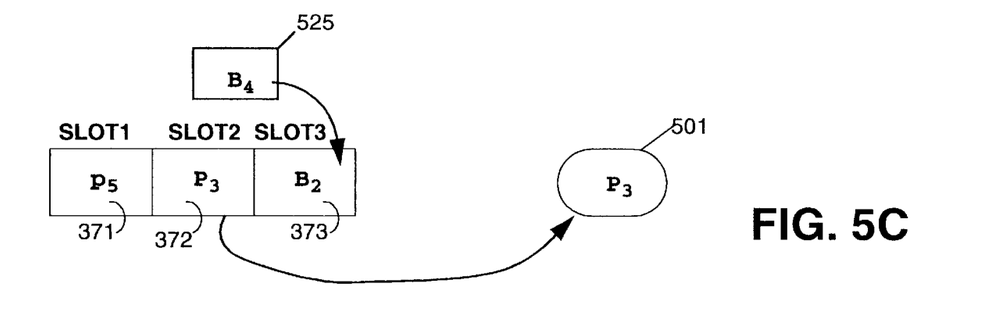

Consider a third example having the display order $I_1B_2P_3B_4P_5$. The corresponding decoding order is $I_1P_3B_2P_5B_4$. As shown by FIG. 5C, the video decoder 383 first decodes the $I_1$ frame and stores the decoded/decompressed $I_1$ frame within slot1 371. The $P_3$ frame is decoded next, utilizing the previously stored decoded/decompressed $I_1$ frame. The decoded/decompressed $P_3$ frame is stored into slot2 372. The $B_2$ frame is decoded next, utilizing both decoded/decompressed frames $I_1$ and $P_3$ respectively stored within slot1 and slot2.

It is desirable to decode $P_5$ next. $P_5$ requires decoded/decompressed frame $P_3$ as a reference but not decoded/decompressed frame $I_1$. Thus, the decoded/decompressed $P_5$ frame may overwrite the decoded/decompressed $I_1$ stored in 371 which is an earlier or older frame as compared to $P_3$.

Next we decode $B_4$ 525, utilizing decoded/decompressed frames $P_3$ and $P_5$. Since $P_3$ is the decoded/decompressed frame which is currently being displayed 501 and $B_2$ is before $P_3$, thus has been displayed, decoded/decompressed $B_4$ can now overwrite $B_2$ which is currently stored in slot3 373.

Figure 5D:
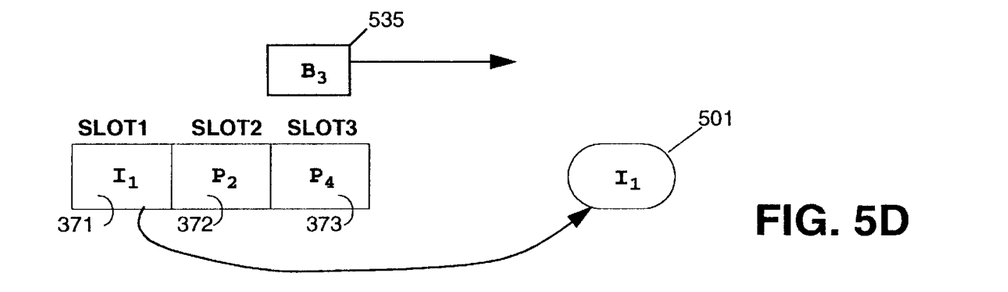

As a fourth example, consider FIG. 5D having the display order $I_1P_2B_3P_4$ having decoding order $I_1P_2P_4B_3$. Video decoder 383 first decodes the $I_1$ frame and stores the decoded/decompressed $I_1$ frame within slot1 371. The $P_2$ frame is decoded next utilizing the previously stored decoded/decompressed $I_1$ frame. The decoded/decompressed $P_2$ frame is stored into slot2 372. The $P_4$ frame is decoded next utilizing the decoded/decompressed frame $P_2$ stored within slot2; the decoded/decompressed frame $P_4$ is now stored in slot3 373.

The decoded/decompressed $I_1$ frame currently is being displayed (501) and the encoded/compressed $B_3$ is next to be decoded 535. Because, B-type frames are not essential to a substantial reproduction of the decompressed Motion- Video™ segments. Therefore, there is no significant loss of resolution of the decompressed MotionVideo™ segments when allowing the encoded/compressed B-type frame to be discarded and the decoded/decompressed $P_2$ frame stored in slot2 372 to be displayed next followed by the decoded/decompressed $P_4$ frame stored in slot3 373.

Figure 5E:
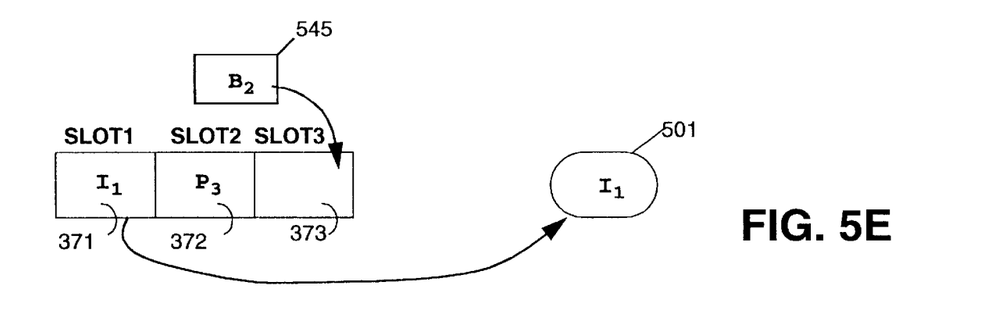

See FIG. 5E for a fifth example. In this example, the display order is $I_1B_2P_3$ and the corresponding decoding order is $I_1P_3B_2$. Video decoder 383 first decodes the $I_1$ frame and stores the decoded/decompressed $I_1$ frame into slot1 371. The $P_3$ frame is decoded next utilizing the previously stored decoded/decompressed $I_1$ frame and is then stored into slot2 372.

As in FIG. 5D, the decoded/decompressed $I_1$ frame is currently being displayed (501) and an encoded/compressed B-type frame is next to be decoded—namely $B_2$ 545. However in this Figure, there is an empty slot—slot3 373. Therefore, utilizing the previously stored decoded/decompressed $I_1$ frame and the previously stored decoded/decompressed $P_3$ frame, the encoded/compressed $B_2$ frame is decoded/decompressed and stored into slot3 373.

Figure 5F:
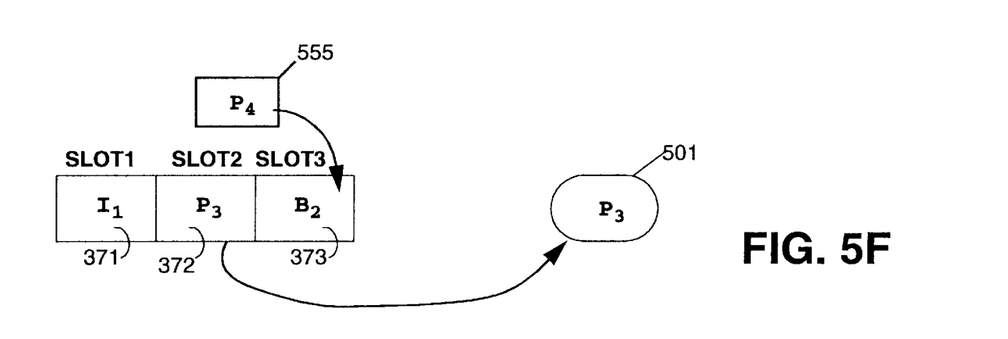

Consider a sixth example shown in FIG. 5F having the display order $I_1B_2P_3P_4$ and corresponding decoding order $I_1P_3B_2P_4$. Video decoder 383 first decodes the $I_1$ frame and stores the decoded/decompressed $I_1$ frame into slot1 371. The $P_3$ frame is decoded next utilizing the previously stored decoded/decompressed $I_1$ frame and is then stored into slot2 372. The $B_2$ frame is decoded next utilizing the previously stored decoded/decompressed $I_1$ frame and the previously stored decoded/decompressed $P_3$ frame. The decoded/decompressed $B_2$ frame is then stored into slot3 373.

The $P_4$ frame 555 is next to be decoded, utilizing the decoded/decompressed frame $P_3$ which is stored within slot2 372 and is currently being displayed (501). Since $P_3$ is currently being displayed and $B_2$ has already been displayed the decoded/decompressed frame $P_4$ is stored in slot3 373 overwriting the decoded/decompressed frame $B_2$.

Figure 5G:
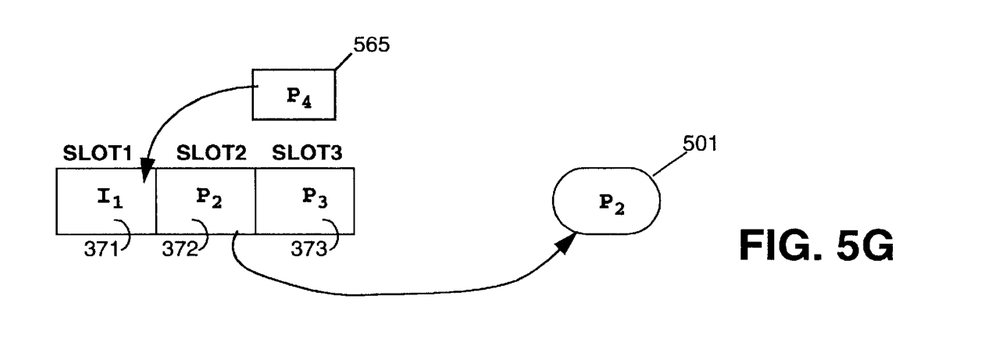

Consider yet a seventh example as shown in FIG. 5G having a display order of $I_1P_2P_3P_4$ and a decoding order of the same, $I_1P_2P_3P_4$. Video decoder 383 first decodes the $I_1$ frame and stores the decoded/decompressed $I_1$ frame within slot1 371. The $P_2$ frame is decoded next utilizing the previously stored decoded/decompressed $I_1$ frame. The decoded/decompressed $P_2$ frame is stored into slot2 372. Next, the $P_3$ frame is decoded utilizing the decoded/decompressed frame $P_2$ stored within slot2. Slot3 normally is utilized to store B-type frames; however, slot3 can also accommodate P-type frames. Therefore, $P_3$ is stored in slot3 373.

The $P_4$ frame 565 is next to be decoded, $P_4$ derives information from the newer decoded/decompressed frame $P_3$ now stored in slot3 373. Since, $P_4$ does not need the older decoded/decompressed frames any longer and there are no B-type frames needing information from previously decoded/decompressed frames, we overwrite the oldest I-type or P-type frame. Thus, $I_1$ is overwritten by storing $P_3$ in slot1 371. The same action described by this example is used when a decoded/decompressed I-type frame is being displayed as an encoded/compressed P-type frame is being decoded or when a decoded/decompressed I-type frame is being displayed while an encoded/compressed I-type frame is being decoded.

MULTIMEDIA SYSTEM

Figure 6:
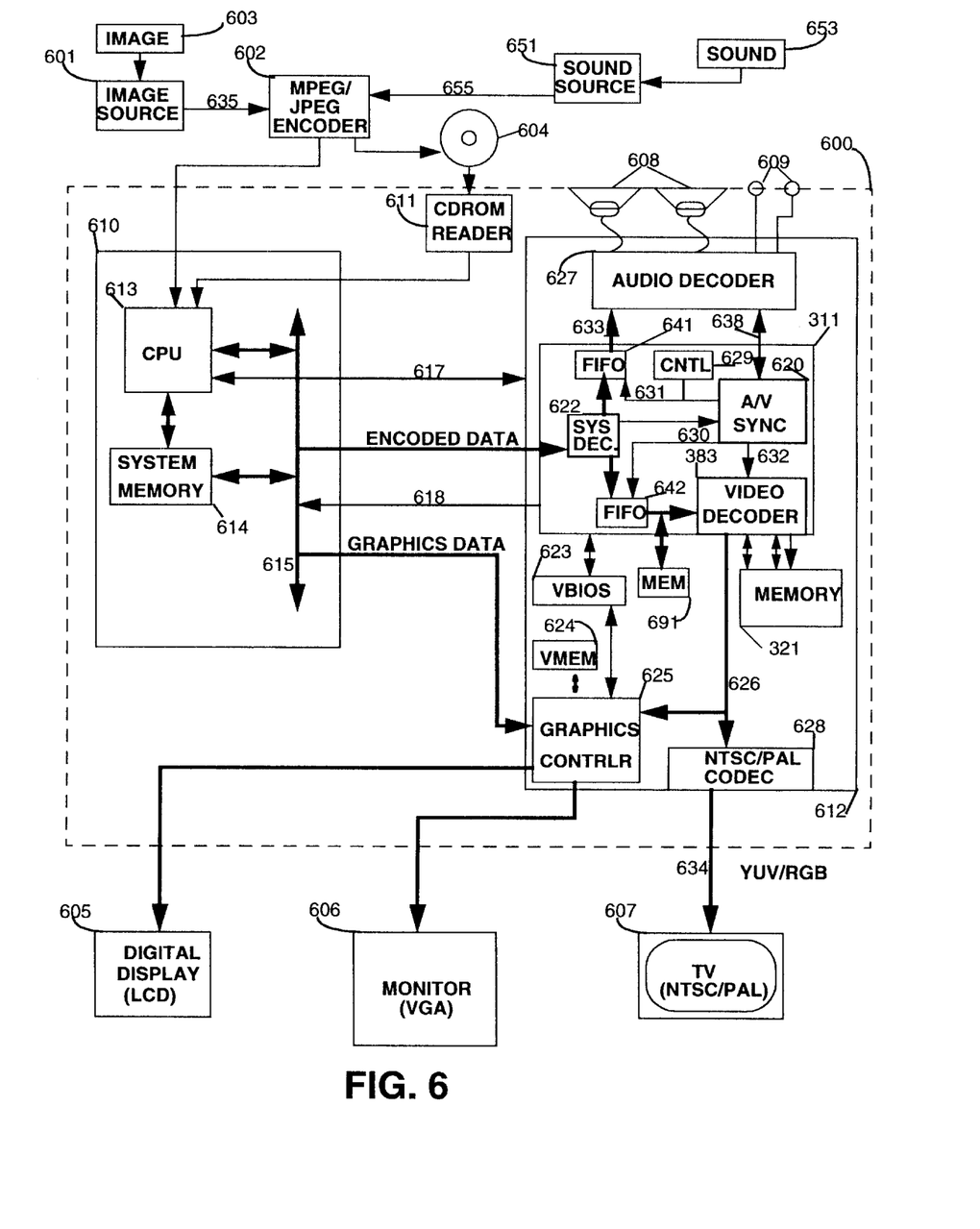
FIG. 6 is a high level system diagram showing how the present invention is used within a multimedia computer system.

An exemplary multimedia application of the present invention is depicted by FIG. 6. A multimedia digital system 600, such as a multimedia computer, has a main system board 610 that internally couples to a CDROM reader 611 and an audio/video decoder 612. The multimedia digital system 600 may be externally coupled to an encoding system that may include an image source 601 and an encoder 602, and may be coupled to external display devices, such as digital display 605, CRT monitor 606 or television 607.

Initially, an encoding is performed on data from some source providing image data. A few examples of sources that provide image data are a video camera, a TV monitor, a computer, a scanner, and a still camera. Regardless of the source, image data is provided on bus 635 into an encoder 602.

An image 603 is read by an image source 601, such as a video camera, and converts it into a stream of data on bus 635 that can be encoded by an encoder 602. Depending upon the type of standard used the encoder 602 can be an MPEG I encoder, an MPEG II encoder, a JPEG encoder, or some other type of unit that generates a compressed/encoded data. After the image data has been encoded, it can be coupled to the processor directly from the encoder 602 or it can be written onto a compact disk read only memory (CDROM) 604. If written onto a CDROM, the disk must be inserted into a CDROM reader 611 in order to couple the compressed/encoded data recorded from the encoder 602 to the processor 613. The processor 613 may be a standard microprocessor, such as an Intel 80486 or a dedicated type of processor. The processor 613 may store the compressed/encoded data into system memory 614 to be later read and placed onto the system bus 615 or it can directly couple the compressed/encoded data onto the system bus 615. The system bus may be an ISA bus, PCI bus, or other standard computer bus or some type of dedicated bus.

The compressed/encoded data stream on system bus 615 is coupled to an audio/video decoder system 612. The compressed/encoded data on the system bus 615 is coupled to the "Vidsyst" decoder 311. Within the Vidsyst decoder 311, the system decoder 622 parses the compressed/encoded data into compressed/encoded video data, compressed/encoded audio data, and timing control signals. The system decoder 622 is coupled to the audio/video sync circuit 620 to convey timing control signals. The system decoder 622 may directly couple to an audio decoder 627 to convey the compressed/encoded audio data or it may indirectly couple to the audio decoder 627 through FIFO 641 that provides temporary storage for frames of the compressed/encoded audio data before being conveyed to the audio decoder 627. The system decoder may also be directly coupled to a video decoder 383 to convey the compressed/encoded video data.

Alternatively, the system decoder 622 may indirectly couple to the video decoder 383 through FIFO 642 that provides temporary storage for frames of the compressed/encoded video data before being conveyed to the video decoder 383. The video encoded data packets within the encoded/compressed area 370 of memory 321 are read out to be decoded and decompressed within the video decoder 383 to generate decompressed video data 107 and decoded/decompressed frames 124 needed by subsequent decoding of P-type or B-type frames. This decompressed video data is provided on bus 626 and stored in slots 371–373 to be used for decoding subsequent frames.

The graphics controller 625 receives the decompressed video data stream and, in conjunction with the video display memory 624, scans an image onto either the digital display 605 or the CRT monitor 606 in a normal fashion. The codec 628 receives the decompressed video data stream and converts it into a data format such as YUV or RGB that is acceptable to a television 607. The codec 628 converts the decompressed video data stream into an NTSC or PAL format for display on an NTSC or PAL television; however, future format conversions may be used as well. The audio decoder 627 decompresses/decodes the compressed/encoded audio data stream into an decompressed audio analog signals to be conveyed to an analog amplification device (not shown) or to drive speakers 608 directly. Alternately, the audio decoder 627 decompresses/decodes the compressed/encoded audio data stream into a decompressed digital audio data stream to be conveyed to a digital amplification device (not shown) over busses 609.

COMBINED VIDEO DATA

FIG. 6 also depicts one method of how graphics data and encoded data share a bus 615 and display devices 605–607. In this case graphics controller 625 has an internal multiplexer (not shown) to combine the decompressed video data stream on bus 626 and the graphics data on bus 615 to be displayed on the same display device monitor 606 or digital display 605. In this case, the graphics data may provide the background window and other windows on the display while the decompressed data is displayed within another window on the same display. TV monitor may have both data types combined on the one display as well.

FIG. 7A is a simplified block diagram corresponding to that of FIG. 6. In FIGS. 6 and 7A, the bus 615 is time multiplexed between the encoded data being driven from the bus into the Vidsyst decoder 619 and graphics data being driven from the bus 615 into the graphics controller 625. The graphics controller contains an internal multiplexer to multiplex the graphics data and the decompressed video data on the same display device.

FIG. 7B depicts another alternative for displaying graphics data and decompressed video data on the same display device. In this case, bus 615 time multiplexes encoded data, graphics data, and decompressed video data generated from the encoded data. The encoded data is placed on the bus 615 and received by the Vidsyst decoder 719 having a bi-direction port. The Vidsyst decoder 719 decodes/decompresses the encoded data to drive decompressed data back onto bus 615. Graphics controller 725 receives both graphics data and decompressed data such that it can be internally multiplexed together for nearly simultaneously display on each of digital display 605, monitor 606, or TV 607. In this case, graphics controller 725 contains more circuitry not only to properly multiplex the two data types but also properly convert the graphics data and the decompressed video data into an NTSC or PAL signal for display onto TV 607.

FIG. 7C depicts another alternative for displaying graphics data and decompressed video data on the same display device using external components. Similarly to FIG. 7A, bus 615 time multiplexes encoded data and graphics data. Vidsyst 619 receives the encoded data from bus 615 and generates a decompressed video data stream that is selectively coupled as pixel data to digital display 605 by multiplexer 701, in turn selectively coupled to monitor 606 as an analog signal through digital analog converter 704 and multiplexer 702, and selectively coupled to TV 607 as an NTSC or PAL signal through NTSC/PAL Codec 628 and multiplexer 703. Graphics controller 726 receives graphics data from bus 615 and provides pixel data for digital display 605, an analog graphics signal for monitor 606, NTSC/PAL signal for TV 607, timing/control signals for displays 605–607 and multiplexer control signals for multiplexers 701–703. Using multiplexers 701–703 the graphics controller properly generates the multiplexer control signals, timing when graphics data and the decompressed video data from the Vidsyst decoder is displayed on any of displays 605–607. Internal multiplexers within graphics controllers 625 and 725 operate in a similar fashion as external multiplexers 701–703.

There accordingly have been described a novel memory controller circuit for multimedia, wherein a memory is partitioned into multiple regions, at least one containing multiple slots for storing frames of decoded/decompressed video data. Frames of data are supplied to and read from the memory pursuant to an algorithm that conforms to MPEG, or other standard, requirements while eliminating image tearing upon transitions between frames While the preferred embodiment and various alternative embodiments of the invention has been disclosed and described in detail herein, it will be obvious to those skilled in the art that various changes in form and detail may be made therein without departing from the spirit and scope thereof.

What is claimed is:

1. A method of determining whether to store frames of video frame data to a partitioned memory comprising a plurality of slots for storing frames of decoded/decompressed video data and for outputting frames of video data to a display; said method comprising the steps of:

receiving an encoded/compressed frame of video data;

determining the type of encoded/compressed video frame data received;

determining the type of decoded/decompressed video frame data currently output from the memory to a display;

decoding the received encoded/compressed video frame data; and retaining a currently stored B-type video frame data and dropping the received encoded/compressed video frame data when B-type decoded/decompressed video frame data is currently output from the memory to a display and the received and decoded encoded/compressed video frame data is B-type video frame data.

2. A method to store video frame data to a memory comprising the steps of:

receiving an encoded/compressed video frame;

determining the type of encoded/compressed frame received;

determining the type of decoded/decompressed frame currently displayed;

determining where in memory the oldest I-type or P-type decoded/decompressed frame is currently stored;

decoding the received encoded/compressed frame; and when a B-type decoded/decompressed frame is currently displayed and when the encoded/compressed frame received and decoded is an I-type or P-type frame, writing the received decoded/decompressed frame to the portion of memory where the oldest I-type or P-type decoded/decompressed frame is stored.

3. A method of storing video frame data to a partitioned memory comprising a plurality of slots for storing frames of decoded/decompressed video data and for outputting frames of video data to a display; said method comprising the steps of:

receiving an encoded/compressed frame of video data;

determining the type of encoded/compressed video frame data received;

determining the type of decoded/decompressed video frame data currently output from the memory to a display;

decoding the received encoded/compressed video frame data; and writing the received decoded/decompressed video frame data to a slot of the memory when I-type or P-type decoded/decompressed video frame data is currently being output from the memory to a display and the received encoded/compressed video frame is B-type video frame data.

4. A method of determining whether to store frames of video data to a memory comprising the steps of:

receiving an encoded/compressed video frame;

determining the type of encoded/compressed video frame received;

determining the type of decoded/decompressed video frame currently displayed;

decoding the received encoded/compressed video frame; and when a I-type or P-type decoded/decompressed frame is currently displayed, and when an I-type or a P-type decoded/decompressed frame is stored in a slot3 of the memory, and when encoded/compressed video frame that was received and decoded is a B-type frame, retaining the currently stored I-type or P-type decoded/compressed frame stored in the slot3 of the memory.

5. A method of determining whether to store frames of video data to a partitioned memory comprising a plurality of slots for storing frames of decoded/decompressed video data and for outputting frames of video data to a display; said method comprising the steps of:

receiving an encoded/compressed frame of video data;

determining the type of encoded/compressed video frame data received;

determining the type of decoded/decompressed video frame data currently output from the memory to a display;

determining whether a slot in the memory is empty;

decoding the received encoded/compressed video frame; and writing the received decoded/decompressed video frame data to an empty slot of the memory when I-type or P-type decoded/decompressed video frame data is currently being output from the memory to a display and the received and decoded encoded/compressed video frame data is B-type frame data, and when a slot of the memory is empty.

6. A method to store video frame data to a memory comprising the steps of:

receiving an encoded/compressed video frame;

determining the type of encoded/compressed frame received;

determining the type of decoded/decompressed frame currently displayed;

determining whether there is a B-type frame stored in a slot3 of the memory which has been displayed;

decoding the received encoded/compressed frame; and when the B-type decoded/decompressed frame stored in the slot3 of the memory has been displayed, and when the encoded/compressed frame that was received and decoded is an I-type or P-type frame, writing the received decoded/decompressed frame to the slot3 of the memory.

7. A method of storing video frame data to a partitioned memory comprising a plurality of slots for storing frames of decoded/decompressed video data and for outputting frames of video data to a display; said method comprising the steps of:

receiving an encoded/compressed frame of video data;

determining the type of encoded/compressed video frame data received;

determining the type of decoded/decompressed video frame data currently output from the memory to a display;

determining in which slot in memory the oldest I-type or P-type decoded/decompressed video frame data is currently stored;

decoding the received encoded/compressed video frame data; and writing the received decoded/decompressed frame data to the slot in the memory where the oldest I-type or P-type decoded/decompressed frame is stored when B-type decoded/decompressed video frame data stored in a slot of the memory has been output from the memory to a display and the received and decoded encoded/compressed video frame is I-type or P-type video frame data.

8. A method of storing video frame data to a partitioned memory comprising a plurality of slots for storing frames of decoded/decompressed video data and for outputting frames of video data to a display; said method comprising the steps of:

receiving an encoded/compressed frame of video data;

determining the type of encoded/compressed video frame data received;

determining the type of decoded/decompressed video frame data currently output from the memory to a display;

determining in which slot in memory the oldest I-type or P-type decoded/decompressed video frame data is currently stored;

decoding the received encoded/compressed video frame data; and writing the received decoded/decompressed video frame data to the slot in memory where the oldest I-type or P-type decoded/decompressed video frame data is stored when B-type decoded/decompressed video frame data is currently output from the memory to a display and the received and decoded encoded/compressed video frame data is I-type or P-type video frame data.

9. A method of determining whether to store frames of video data to a partitioned memory comprising a plurality of slots for storing frames of decoded/decompressed video data and for outputting frames of video data to a display; said method comprising the steps of:

receiving an encoded/compressed frame of video data;

determining the type of encoded/compressed video frame data received;

determining the type of decoded/decompressed video frame data currently output from the memory to a display;

decoding the received encoded/compressed video frame data; and retaining currently stored I-type or P-type decoded/compressed video frame data stored in a slot of the memory when a I-type or P-type decoded/decompressed video frame is currently output from the memory to a display and the received and decoded encoded/compressed video frame data is B-type video frame data.

10. A method of storing video frame data to a partitioned memory comprising a plurality of slots for storing frames of decoded/decompressed video data and for outputting frames of video data to a display; said method comprising the steps of:

receiving an encoded/compressed frame of video data;

determining the type of encoded/compressed video frame data received;

determining the type of decoded/decompressed video frame data currently output from the memory to a display;

determining whether there is B-type video frame data stored in a slot of the memory which has been output from the memory to a display;

decoding the received encoded/compressed video frame data; and writing the received decoded/decompressed video frame data to a slot of the memory when B-type decoded/decompressed video frame data stored in a slot of the memory has been output from the memory to a display, and when the received and decoded encoded/compressed video frame data was I-type or P-type video frame data.

* * * * *